United States Patent [19]
Paterson et al.

[11] Patent Number: 6,051,029
[45] Date of Patent: Apr. 18, 2000

[54] METHOD OF GENERATING A DISPLAY FOR A DYNAMIC SIMULATION MODEL UTILIZING NODE AND LINK REPRESENTATIONS

[75] Inventors: Thomas S. Paterson, Redwood City; Samuel Holtzman, Saratoga; Alex L. Bangs, La Honda, all of Calif.

[73] Assignee: Entelos, Inc., Menlo Park, Calif.

[21] Appl. No.: 08/962,524

[22] Filed: Oct. 31, 1997

[51] Int. Cl.[7] .................................................. G06F 9/455
[52] U.S. Cl. ............................ 703/22; 345/334; 345/335
[58] Field of Search ............................... 395/500.43, 701, 395/710; 709/300, 301, 303, 305; 345/418, 428, 429, 433, 441, 442, 443, 326, 333, 334, 335

[56] References Cited

U.S. PATENT DOCUMENTS

| | | | |
|---|---|---|---|
| 3,800,288 | 3/1974 | Russell et al. | 700/83 |
| 4,873,623 | 10/1989 | Lane et al. | 364/188 |
| 4,881,175 | 11/1989 | Ladner | 702/138 |
| 5,005,143 | 4/1991 | Altschuler et al. | 702/181 |
| 5,081,584 | 1/1992 | Omichinski et al. | 395/500.27 |
| 5,307,287 | 4/1994 | Cramer, III et al. | 395/500.23 |
| 5,331,573 | 7/1994 | Balaji et al. | 395/500.32 |
| 5,418,944 | 5/1995 | DiPace et al. | 707/3 |
| 5,424,963 | 6/1995 | Turner et al. | 395/500.27 |
| 5,434,796 | 7/1995 | Weininger | 395/500.33 |
| 5,463,564 | 10/1995 | Agrafiotis et al. | 700/268 |
| 5,481,741 | 1/1996 | McKaskle et al. | 345/522 |
| 5,495,423 | 2/1996 | DeLisi et al. | 709/226 |
| 5,526,281 | 6/1996 | Chapman et al. | 702/22 |
| 5,544,067 | 8/1996 | Rostoker et al. | 395/500.35 |
| 5,555,201 | 9/1996 | Dangelo et al. | 395/500.02 |
| 5,566,295 | 10/1996 | Cypher et al. | 345/326 |
| 5,623,418 | 4/1997 | Rostoker et al. | 395/500.02 |
| 5,657,255 | 8/1997 | Fink et al. | 395/500.32 |
| 5,680,590 | 10/1997 | Parti | 395/500.23 |
| 5,715,413 | 2/1998 | Ishai et al. | 345/349 |

(List continued on next page.)

FOREIGN PATENT DOCUMENTS

| | | | |
|---|---|---|---|
| 0 483 040 A2 | 4/1992 | European Pat. Off. | G06F 9/44 |
| 0 587 519 A1 | 3/1994 | European Pat. Off. | G06F 3/023 |

OTHER PUBLICATIONS

"A Flexible Graphical User Interface for Performance Modeling", Yi–Bing Lin and Dan Daly, *Software Practice & Experience*, vol. 25, No. 2, Feb. 1995, pp. 193–216.

"IDF: A Graphical Data Flow Programming Language for Image Processing and Computer Vision", Neil Hunt, *Proceedings of the International Conference on Systems, Man and Cybernetics*, Nov. 4, 1990, pp. 351–360.

"User Interface to Support Multiple Actions Within a Connection", *IBM Technical Disclosure Bulletin*, vol. 37 No. 7, Jul. 1, 1994, p. 379.

(List continued on next page.)

*Primary Examiner*—Kevin J. Teska
*Assistant Examiner*—Russell W. Frejd
*Attorney, Agent, or Firm*—Blakely, Sokoloff, Taylor & Zafman

[57] ABSTRACT

A method of generating a display, or representation, of a simulation model within a graphical user interface (GUI) is described. The simulation model includes a number of objects, which may include state, function, link and modifier objects. The method commences with the display of node representations for at least first and second objects. Thereafter, a link representation, which represents an underlying link object, is selected from a predefined set of link representations to represent a desired relationship condition between the first and second objects. Each link representation of the set is associated with a distinct relationship condition. Each relationship condition may further be defined in terms of an underlying equation. Thereafter, the selected link representation is shown to extend between the respective node representations representing the first and second objects. Thus, the type of relationship condition which exists between the first and second objects is apparent from the link representation which extends between the relevant node representations.

37 Claims, 11 Drawing Sheets

U.S. PATENT DOCUMENTS

| | | | |
|---|---|---|---|
| 5,729,466 | 3/1998 | Bamji | 395/500.11 |
| 5,737,727 | 4/1998 | Lehmann et al. | 705/7 |
| 5,757,678 | 5/1998 | Leeke | 395/500.27 |
| 5,808,918 | 6/1997 | Fink et al. | 395/500.32 |
| 5,845,124 | 12/1998 | Berman | 395/500.23 |
| 5,872,957 | 2/1999 | Worthington et al. | 395/500.34 |

OTHER PUBLICATIONS ithink, The Visual Thinking Tool for the 90's, Introduction to Systems Thinking and ithink, High Performance Systems, Inc., 1994, Chapter 2 Stocks & Flows, Infrastructures and Feedback Loops, pp. 25–38.

ithink, The Visual Thinking tool for the 90's, Introduction to Systems Thinking and ithink, High Performance Systems, Inc., 1994, Chapter 3 Basic Building Blocks, pp. 39–64.

ithihnk, The Visual Thinking Tool for the 90's, Introduction to Systems Thinking and ithink, High Performance Systems, Inc., 1994, Chapter 12 The Simulation Algorithms, pp. 12–1 to 12–13.

ithink, The Visual Thinking Tool for the 90's, Technical Reference, High Performance Systems, Inc., 1994, Chapter 4 Building Blocks, pp. 4–1 to 4–36.

Powersim 2.5, User's Guide, Powersim Corporation, 1996, Chapter 2 Building and Simulating Models, pp. 11–36.

Extend, Performance modeling for decision support, User's Manual, Imagine That, Inc., 1994, Chapter 4 Using the Generic and Discrete Event Libraries, pp. 69–102.

Extend, Performance modeling for decision support, User's Manual, Imagine That, Inc., 1994, Chapter 1 Running a Model, pp. 11–24.

Extend, Performance modeling for decision support, User's Manual, Imagine That, Inc., 1994, Chapter 2 Building a Model, pp. 25–46.

Karp, P.D. and Freidland, P., "Coordinating the Use of Qualitative and Quantitative Knowledge in Declarative Device Modeling", Artificial Intelligence, Simulation and Modeling, Chapter 7–8 pp. 189–207.

Patil, R.S., Szolovits, P. and Schwartz, W.B., "Casual Understanding of Patient Illness in Medical Diagnosis", IJCAI, pp. 893–899, 1981.

Davis, R., "Reasoning from first principles in electronic troubleshooting", International Journal of Man–Machine Studies, vol. 19, pp. 403–423, 1983.

"Editorial: Developments in Expert Systems", International Journal of Man–Machine Studies, vol. 19, pp. 399–402, 1983.

DeKleer, J. and Brown, J.S., "A Qualitative Physics Based on Confluences", Artifical Intelligence, vol. 24, pp. 7–83, 1984.

Forbus, K.D., "Qualitative Process Theory", Artificial Intelligence, vol. 23, pp. 85–168, 1984.

Kuipers, B., "Qualitative Simulation", Artificial Intelligence, vol. 29, pp. 289–388, 1986.

Fink, P.K. and Lusth, J.C., "Expert Systems and Diagnostic Expertise in the Mechanical and Electrical Domains", IEEE Transactions on Systems, Man and Cybernetics, vol. SMC–17, No. 3, pp. 340–349, May/Jun., 1987.

Fishwick, P.A., "A Study of Terminology and Issues in Qualitative Simulation", Department of Computer and Information Sciences, University of Florida, pp. 5–9, Jan. 1989.

Fishwick, P.A., "Qualitative methodology in simulation model engineering", Simulation vol. 52, No. 3, pp. 95–101, Mar. 1989.

Clancey, W.J., "Viewing Knowledge Bases as Qualitative Models", IEEE Expert, Tools and Techniques, pp. 9–23, Summer 1989.

Barr, A., Cohen, P.R. and Feigenbaum, E.A., "Knowledge–based Simulation, Alfred round–Intelligent Interfaces", The Handbook of Artificial Intelligence, vol. 4, Chapter 22, pp. 7–15, Dec. 1989.

Weld, D.S. and de Kleer, J., "Readings in Qualitative Reasoning About Physical Systems", pp. 1–10, 1990.

Cellier, F.E., "Qualitative Modeling and Simulation: Promise or Illusion", Proceedings of the 1991 Winter Simulation Conference, pp. 1086–1090, 1991.

Celada, F. and Seiden, P.E., "A computer model of cellular interactions in the immune system", Immunology Today, vol. 13, No. 2, pp. 56–62, 1992.

Hamscher, W., Console, L. and deKleer, J., "Readings in Model–based diagnosis", Chapter 1, pp. 1–2, 1992.

Uckun, W., "Model–Based Reasoning In Biomedicine", Critical Reviews in Biomedical Engineering, vol. 19(4), pp. 261–292, 1992.

Conolly, R.B. and Kimbell, J.S., "Computer Simulation of Cell Growth Governed by Stochastic Processes: Application to Clonal Growth Cancer Models", Toxicology and Applied Pharmacology, vol. 124, pp. 284–295, 1994.

Aliev, M.K., and Saks, V.A., "Mathematical modeling of intercellular transport processes and the creatine kinase systems: a probability approach", [Review], Molecular & Cellular Biochemistry, vol. 133–124, pp. 333–346, Apr.–May, 1994.

Sieburg, H.B., "Methods in the Virtual Wetlab I: Rulebased reasoning driven by nearest–neighbor lattice dynamics", Artificial Intelligence in Medicine, vol. 6, No. 4, pp.301–319, Aug. 1994.

Pedley, T.J., Corieri, P., Kamm, R.D., Grotberg, J.B., Hydon, P.E. and Schroter, R.C., "Gas flow and mixing in the airways", Critical Care Medicine, vol. 22, No. 9, pp. S24–S36, Sep. 1994.

Sieburg, H.B. and Muller–Sieburg, C., "The CyberMensch Simulation Server for the Planning of Clinical Trials", Interactive Technology and New Paradigm for Healthcare, Chapter 65, pp. 445–454, 1995.

Hoang, K.T., "Physiologically based pharmacokinetic models: mathematical fundamentals and simulation implementations", Toxicology Letters, vol. 79, pp. 99–106, Sep. 1995.

Sieburg, H.B., "In Silico Environments Augment Clinical Trials", IEEE Engineering in Medicine and Biology, vol. 15, No. 2, pp. 47–59, Mar./Apr., 1996.

Conolly, R.B. and Andersen, M.E., "Biologically Based Pharmacodynamic Models: Tools for Toxicological Research and Risk Assessment", Annual Review of Pharmacology and Toxicology, vol. 31, pp. 503–523, 1991.

Berger, M.P., Gelfand, R.A. and Miller, P.L., "Combining Statistical Rule–Based and Physiologic Model–Based Methods to Assist in the Management of Diabetes Mellitus", Computers and Biomedical Research, pp. 356–357, 1990.

Dijkstra, J., Neal, H.D.St.C., Beever, D.E. and France, J., "Simulation of Nutrient Digestion, Absorption and Outflow in the Rumen: Model Description", The Journal of Nutrition, vol. 122, No. 11, pp. 2239–2256, Nov. 1992.

Dong, M.H., "Microcomputer programs for physiologically–based pharmacokinetic (PB–PK) modeling", Computer Methods and Programs in Biomedicine, vol. 45, No. 3, pp. 213–221, Dec. 1994.

Keller, F., Frankewitsch, T., Zellner, D., Simon, S. Czock, D. and Giehl, M., "Standardized structure and modular design of a pharmacokinetic database", Computer Methods and Programs in Biomedicine, pp. 107–115, 1998.

Parameter

Definition
Symbol      C
Definition  coefficient

Units
Assessed      hours           Internal      hours − 1
○ Multiplicative Conversion   hours − 1 = K/hours
● Reciprocal Conversion       where K = 0.693147

Settings
|  | hours | Description |
|---|---|---|
| Working | 2.0 | slower |
| Baseline | 3.0 | nominal |
| Comparison | 1.0 |  |

Range
|  | hours | Description |
|---|---|---|
| Low | 1.0 | fastest observed |
| High | 5.0 | slowest observed |

[Cancel]  [OK]

FIG. 5

METHOD OF GENERATING A DISPLAY FOR A DYNAMIC SIMULATION MODEL UTILIZING NODE AND LINK REPRESENTATIONS

FIELD OF THE INVENTION

The present invention pertains generally to the field of simulation modeling. More specifically, the present invention relates to methods of representing objects within a simulation model.

BACKGROUND OF THE INVENTION

Simulation modeling is commonly used to model systems to perform "what-if" analyses, to optimize system performance and to identify problems within systems. Graphical simulation modeling allows a complex system to be modeled in an intuitive and visually comprehensible manner, and has found application in wide range of fields, from business to biological analysis.

The construction of a simulation model typically involves identifying various objects within the system, which are then represented by variables, equations or both embodied in an "object". A simulation model may be constructed using a graphical user interface (GUI) in which the various objects are represented by user-selected icons or other appropriate graphical representations, and in which the interrelationships between the objects are represented by links.

A simplified representation of a typical prior art graphical user interface (GUI) for a graphical simulation model is shown FIG. 1. Specifically, the prior art GUI of FIG. 1 includes a diagram window 10, within which are displayed node representations for various objects of a modeled system. Each of the various objects of the modeled system is shown to be either an entity object 12, an input object 14 or a link object 16. Each of the objects typically includes at least one parameter 18 which has a parameter name, an assigned value 20 and parameter documentation 22 which describes the parameter 18.

Known simulation modeling tools include the Process Charter from Scitor Corporation of Menlo Park, Calif.; PowerSim from Modell Data AS in Bergen, Norway (http://www.powersim.com); Ithink and Stella from High Performance Systems Incorporated of Hanover, N,H. (http://hps-inc.com); and Extend +BPR from Imagine That! Incorporated of San Jose, Calif. (http://www.imaginethatinc.com). FIG. 2 illustrates a simulation model 30 as generated utilizing the Ithink product from High Performance Systems, Inc. The simulation model represents a work-in/work-out system within a business. The simulation model 30 is shown to include an object 32 that represents "work backlog", the object 32 being fed by arriving work orders 34 and depleted by filled work orders 36. The rate at which work orders are fed to the backlog object 32 is determined by an object 39, which functions as a "valve" with respect to a pipe by which work orders are fed to the object 32. Similarly, the rate at which work orders are dispensed from the object 32 is dependent upon an object 38 which functions as a "valve" for the pipe by which work orders are dispensed from the object 32. The object 38 is shown to receive as inputs the number of workers within the system, as represented by object 42, and the weekly productivity of each of these workers, as represented by the input parameter 40. The weekly productivity of the workers is further a function of hours per week per worker, represented by object 44. The production per hour worked, represented by object 46, is further shown to influence the weekly productivity per worker. Productivity per hour worked is in turn influenced by an average burnout factor, which is represented by an object 48. Various other factors are shown to influence the object 48. While the simulation model 30 shown in FIG. 2 provides a satisfactory representation of the work-in/work-out system, the model 30 suffers from a number of inefficiencies. Specifically, the mathematical structure underlying the model 30 is not readily apparent from a viewing of the icons, and can only be guessed at as a result of the labels which are attached to the various nodes shown in the simulation model 30. Further, the numerous icons that are used to represent objects, inputs, pipes and links (as well as the labels associated with each of these icons) result in a cumbersome and cluttered depiction of the modeled system.

SUMMARY OF THE INVENTION

According to a first aspect of the invention, there is provided a method of generating a display of a simulation model including first and second objects between which a relationship condition exists. The method commences with the display of respective first and second node representations for the first and second objects. Thereafter, a link representation is selected from a predetermined set of link representations to represent a relationship condition between the first and second objects. Each link representation within the set is associated with a different relationship condition. The selected link representation is then displayed to represent the relationship condition between the first and second objects.

According to a second aspect of the invention, there is provided a method of presenting a set of link representations to represent a relationship condition between first and second objects in a display of a simulation model. A predetermined set of potential relationship conditions between objects within the simulation model is defined. Thereafter, a respective link representation is assigned to each relationship condition of the predetermined set of relationship conditions, so as to define a set of link representations. The set of link representations is then presented on a display device for selection by a user to represent the relationship condition between the first and second objects of the simulation model.

According to a third aspect of the invention, there is provided a computer-readable medium storing a sequence of instructions which, when executed by a processor, cause the processor to perform the steps of the above described first and second aspects of the present invention.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 5 illustrates, a parameter window which allows a user to view and input information pertaining to a parameter of a simulation model according to one embodiment of the present invention.

DETAILED DESCRIPTION

A method of generating a display for a simulation model including first and second objects is described. In the following description, for the purposes of explanation, numerous specific details are set forth in order to provide a thorough understanding of the present invention. It will be evident, however, to one skilled in the art that the present invention may be practiced without these specific details.

Figure 1:
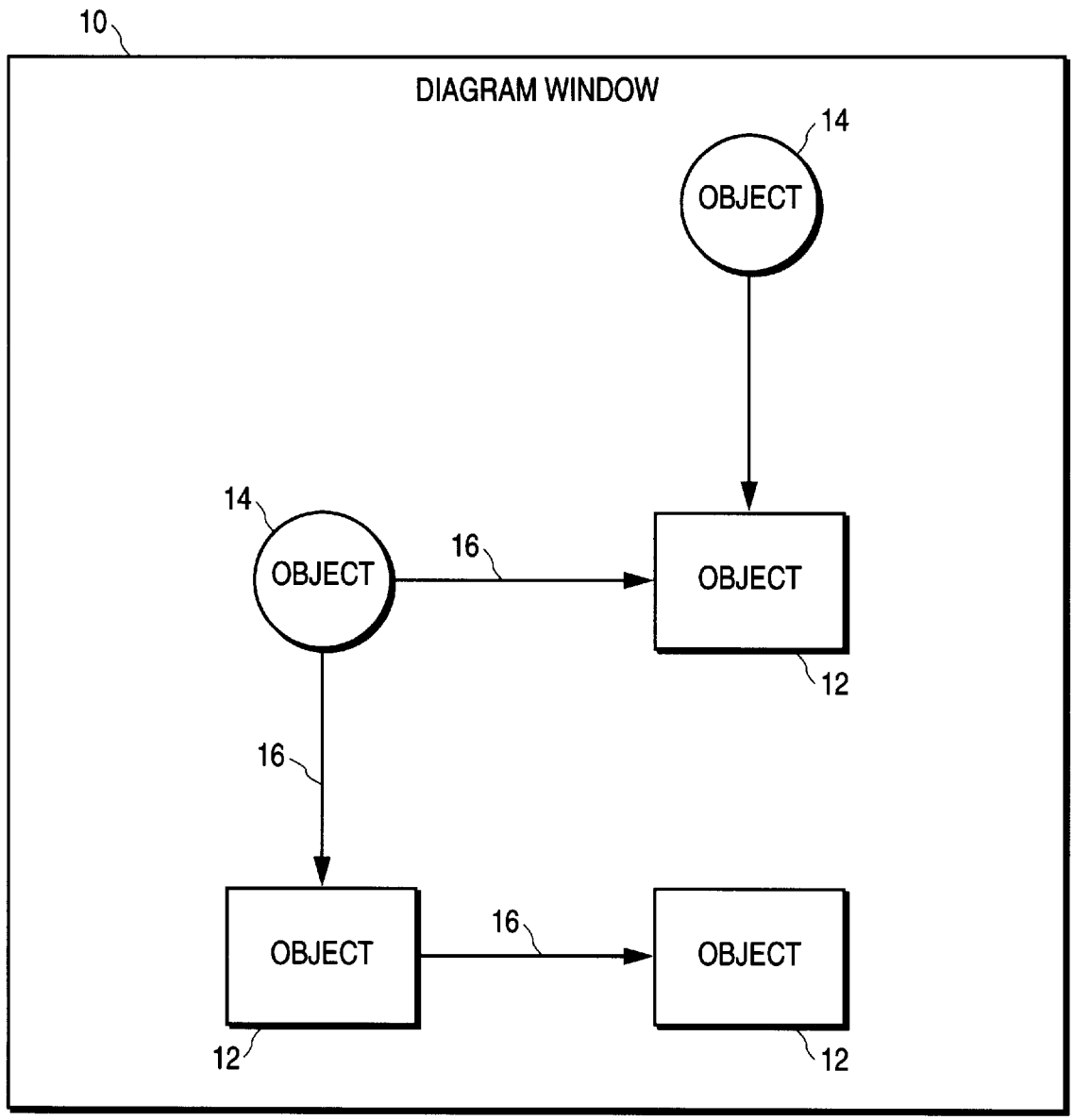
FIG. 1 illustrates a graphical user interface (GUI) utilized in the prior art to generate a display for a simulation model.
Figure 2:
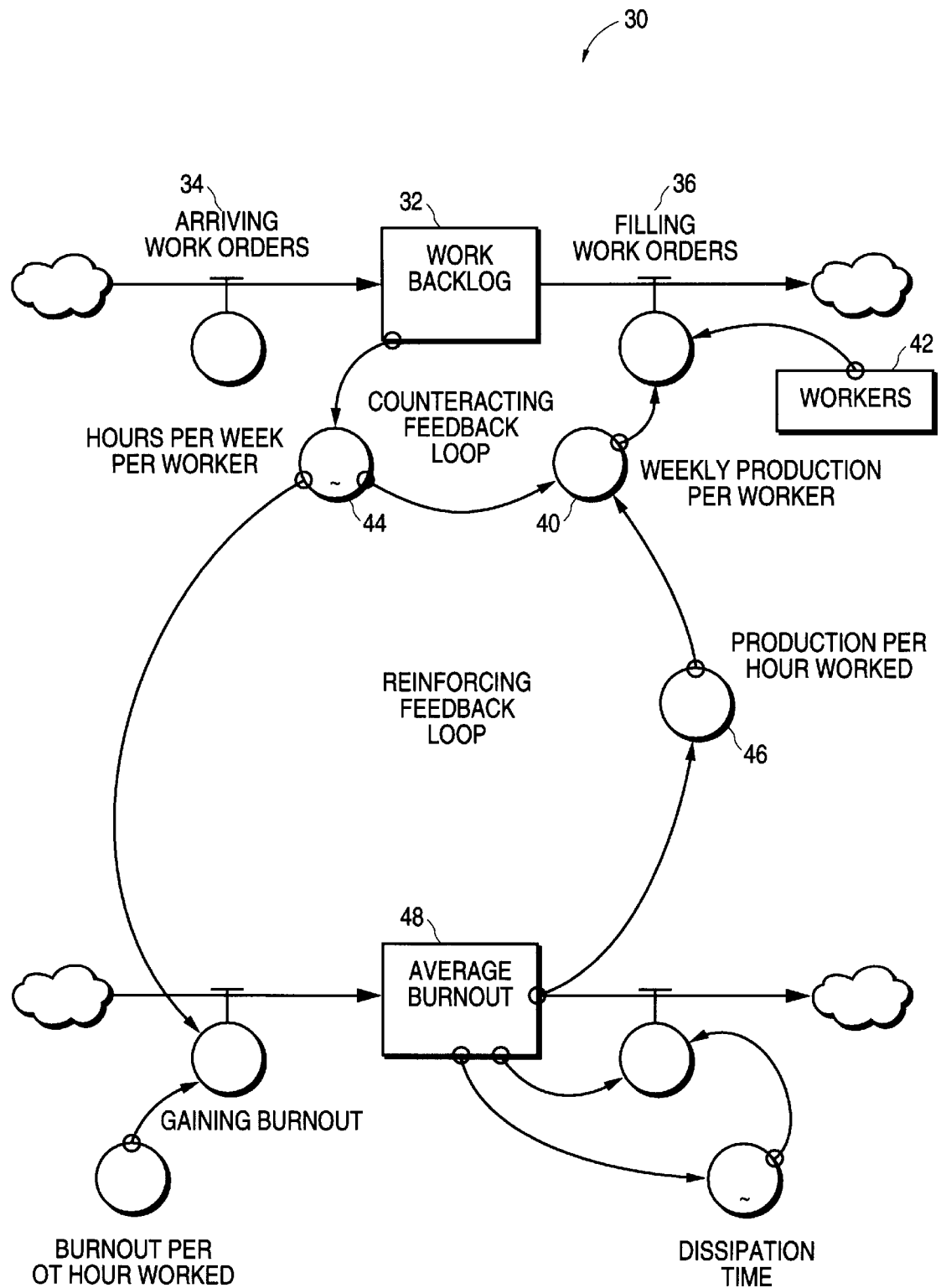
FIG. 2 illustrates a representation of a simulation model generated using a prior art modeling tool.
Figure 3:
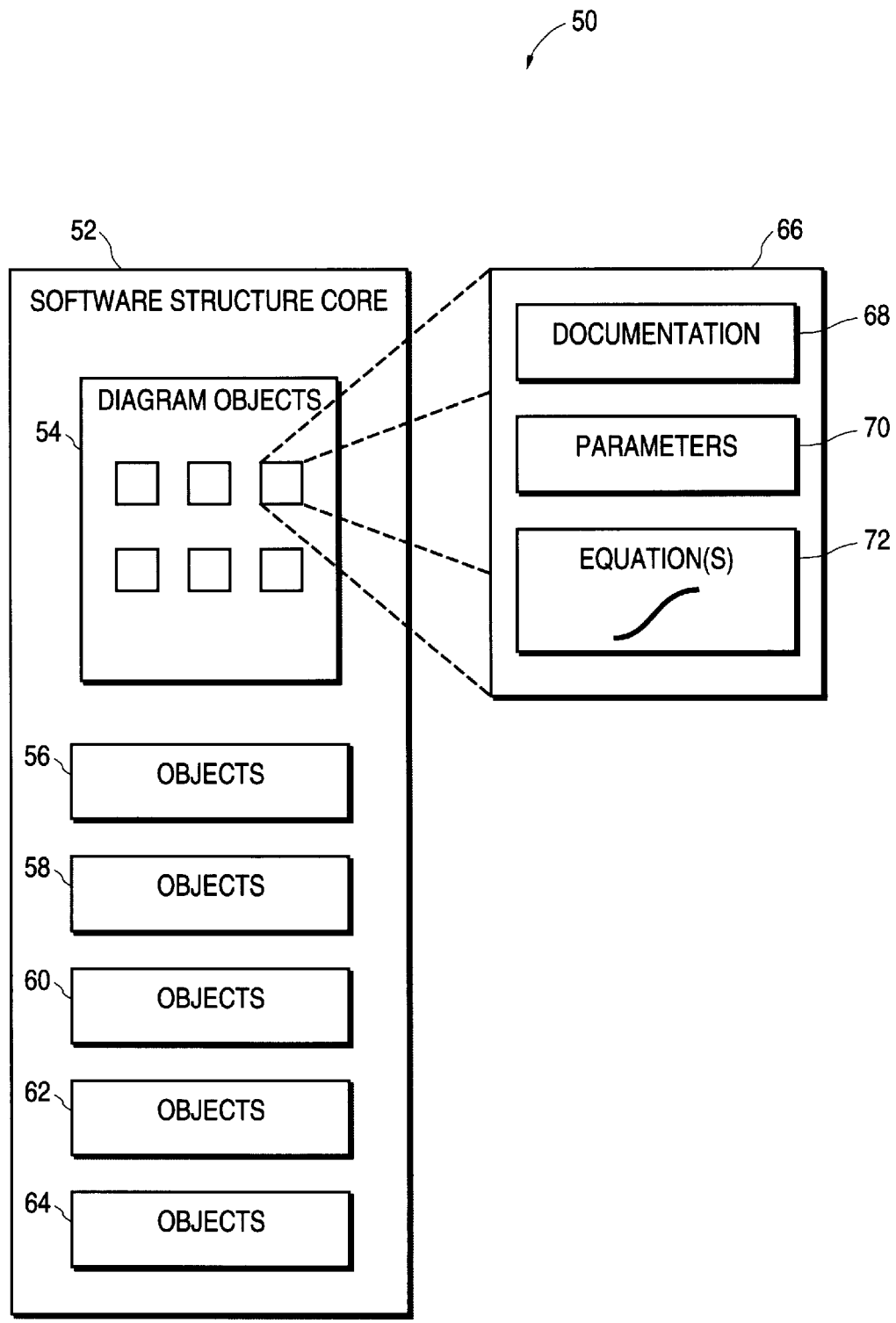
FIG. 3 is a diagrammatic representation of simulation modeling software according to one embodiment of the present invention.

The present specification describes exemplary methods for representing simulation models of systems utilizing graphical simulation modeling software. Referring to FIG. 3, there is provided a diagrammatic representation of one exemplary embodiment of simulation modeling software 50 according to the present invention. Specifically, the modeling software 50 comprises a core 52, which may be coded using an object-oriented language such as the C++ or Java programming languages. Accordingly, the core 52 is shown to comprise classes of objects, namely diagram objects 54 and other object classes 56–64. As is well known within the art, each object within the core 52 may comprise a collection of parameters (also commonly referred to as instances, variables or fields) and a collection of methods which utilize the parameters of the relevant object. The functioning and purposes of each of the various classes of objects shown in FIG. 3 will become apparent from the description that follows. An exploded view of the contents of an exemplary diagram object 66 is provided, from which it can be seen that the diagram object 66 includes documentation 68 which provides a description of the diagram object, a collection of parameters 70, and methods 72 which may define an equation or a class of equations. The diagram objects 54 each define a feature or object of a modeled system which is displayed within a diagram window presented by a graphical user interface (GUI) which interacts with the core 52. According to one exemplary embodiment of the invention, the diagram objects 54 may include state, function, modifier and link objects which are represented respectively by state nodes, function nodes, modifier icons and link icons within the diagram window.

Figure 4:
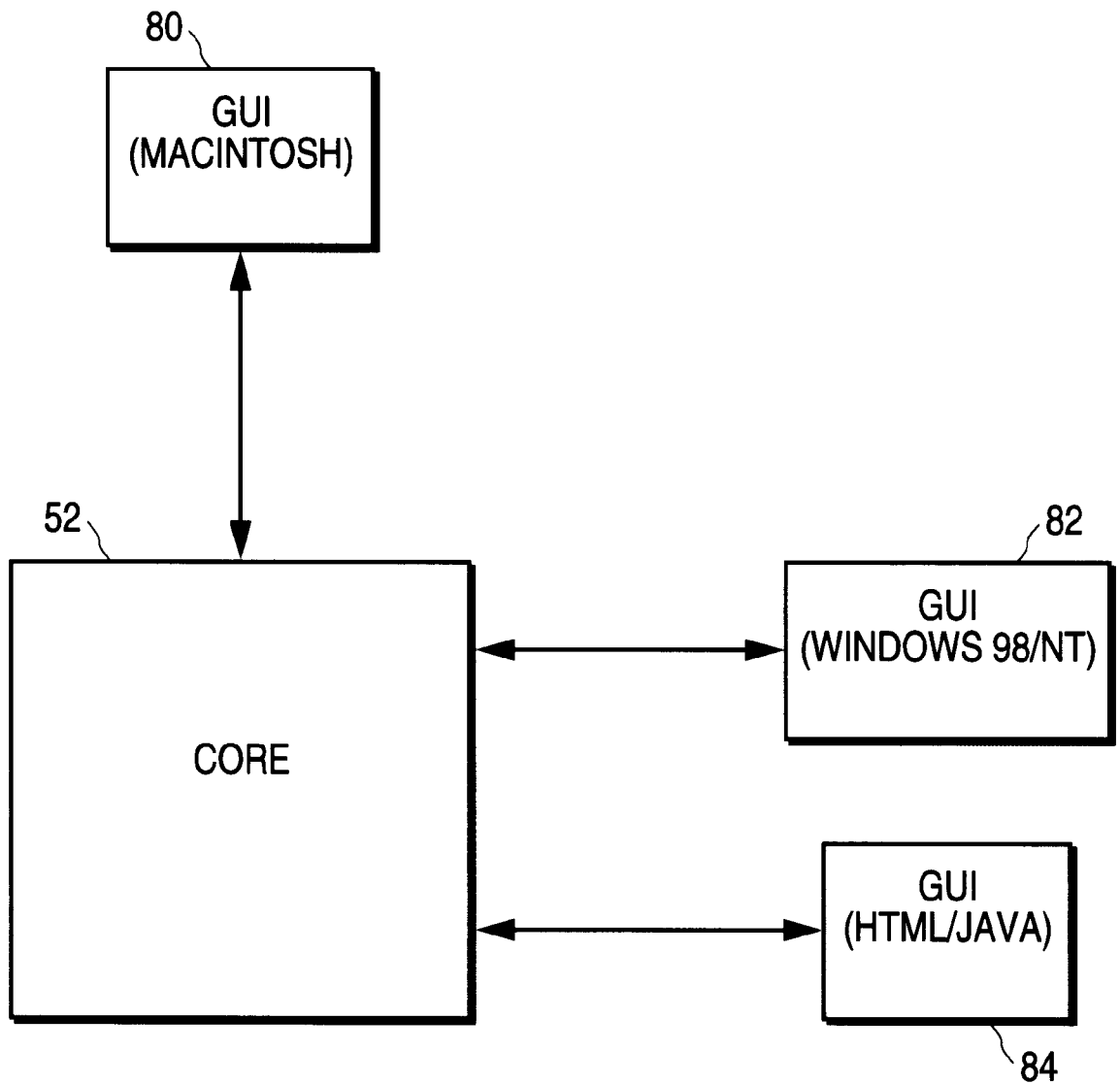
FIG. 4 is a diagrammatic representation of the interaction between the software illustrated in FIG. 3 and GUIs operating on various software platforms.

FIG. 4 provides a diagrammatic representation of the core 52, which is shown to be capable of interaction with any one of a number of GUIs. Specifically, the core 52 is shown to interface with a GUI 80 operating on the Macintosh platform developed by Apple Computer, Inc. of Cupertino, Calif. a GUI 82 operating on either the Windows '98 or Windows NT platforms developed by Microsoft Corporation of Redmond, Wash., or a platform-independent GUI 84 coded in Hyper-Text Markup Language (HTML) or the Java language developed by Sun Microsystems of Mountain View, Calif. Each of the GUIs interacts with the core 52 to present a diagram window in which icons representative of the diagram objects 54 are displayed, and in which panels (or windows) representative of objects may be displayed.

Parameters

As discussed with reference to FIG. 3, each object defined within the software core 52 may have at least one parameter associated therewith which quantifies the characteristics of the object, and which is used during simulation of the modeled system. It will also be appreciated that not all objects must include a parameter. In one exemplary embodiment of the invention, several types of parameters are defined. Firstly, system parameters may be defined for each subject type. For example, a system parameter may comprise an initial value for a state object, or a coefficient value for a link object. Other parameter types include object parameters and diagram parameters that facilitate easy manipulation of values in simulation operations. Specifically, diagram parameters may be available to all objects, whereas object parameters may be available to only a single object. For the purposes of this specification, the term "parameter value" shall be taken to encompass an input (initial) value, an output value or any intermediate value of a parameter, unless explicitly stated otherwise.

Referring now to FIG. 5, there is shown a parameter window 90, that may be generated by any one of the GUIs shown in FIG. 4, and that provides a user with information regarding a parameter and allows the user to input or specify a value to be attributed to the respective parameter. The manner by which a parameter window 90 is invoked and constructed within a GUI will be described below. The exemplary parameter window 90 is shown to include four sections, namely a definition section 92, a units section 94, a settings section 96 and a range section 98 The definition section 92 displays an identifier (or symbol) for the parameter, as well as an appropriate definition of the parameter. In the illustrated parameter window 90, the parameter is represented by the symbol "C", which is defined as the coefficient of an equation within a specific object. The units section 94 displays units used internally and for assessment. For example, a user may input an assessment value, which is converted to an internal value. The units used for assessment are used for a value that is designated as a "working" value in the settings section 96. If the internal and assessed units are different, a conversion may also be indicated in the units section 94. In the illustrated example, the assessed value is reciprocated and multiplied by a constant K that converts from "hours" assessed to a half-life calculation value.

The range section 98 may optionally be used to define upper and lower value limits that may be assigned to the parameter. Again, description fields for each of the upper and lower limits are provided.

Graphical Elements

Figure 6:
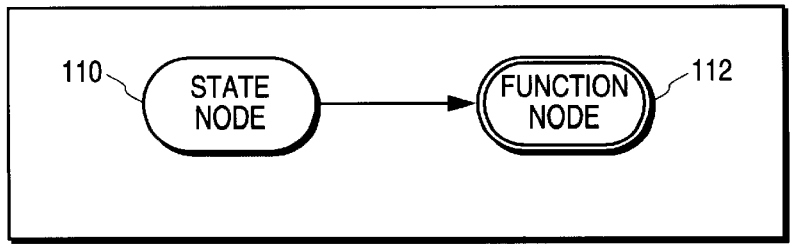
FIG. 6 illustrates three exemplary node representations which may be utilized to represent objects of a simulation model according to the present invention.
Figure 7:
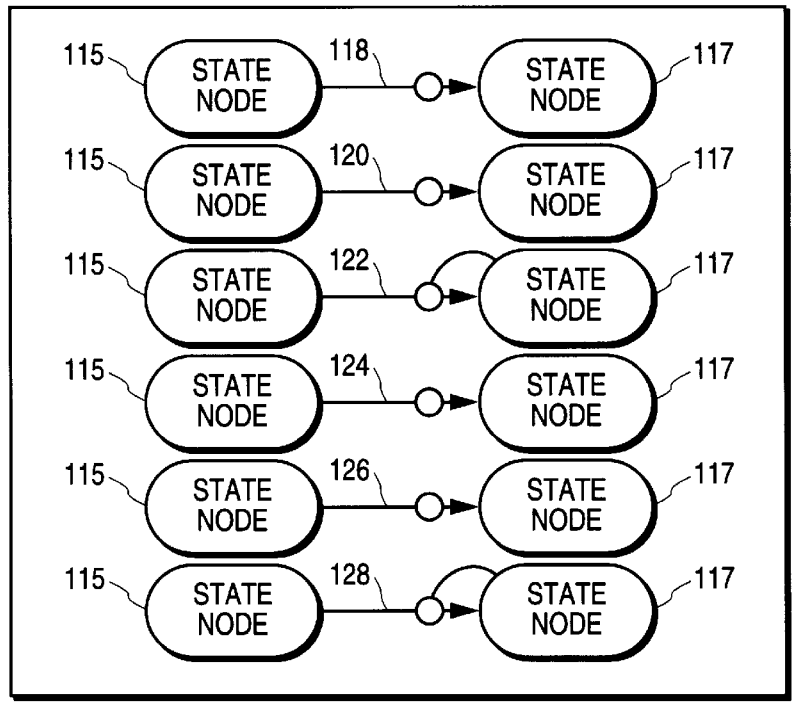
FIG. 7 illustrates exemplary link representations which may be utilized, according to one embodiment of the present invention, to illustrate a relationship condition between state or function nodes of a simulation model.
Figure 8:
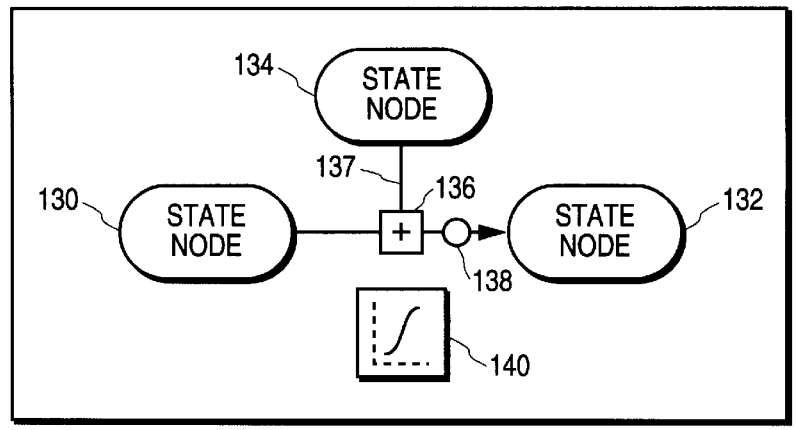
FIG. 8 illustrates a modifier representation which, according to one embodiment of the present invention, may be utilized to represent the influence of a third node on a relationship condition which exists between first and second nodes of a simulation model.

FIGS. 6–8 provide examples of graphical elements which, according to one exemplary embodiment of the invention, may be utilized to construct a display of a simulation model according to the invention. The illustrated graphical elements are made available by a GUI to a model builder, who is then able to construct a representation of a modeled system. In the description which follows, the term "node" is used to reference an icon which is representative of an object. For the purposes of this specification, the term "node" shall however be taken to refer to any representation of an object. Accordingly, the terms "node" and "object" should be regarded as interchangeable and synonymous. It will be appreciated that the graphical elements discussed below are exemplary and any distinctive graphical elements may be substituted for the graphical elements discussed below without departing from the spirit of the invention.

Figure 9:
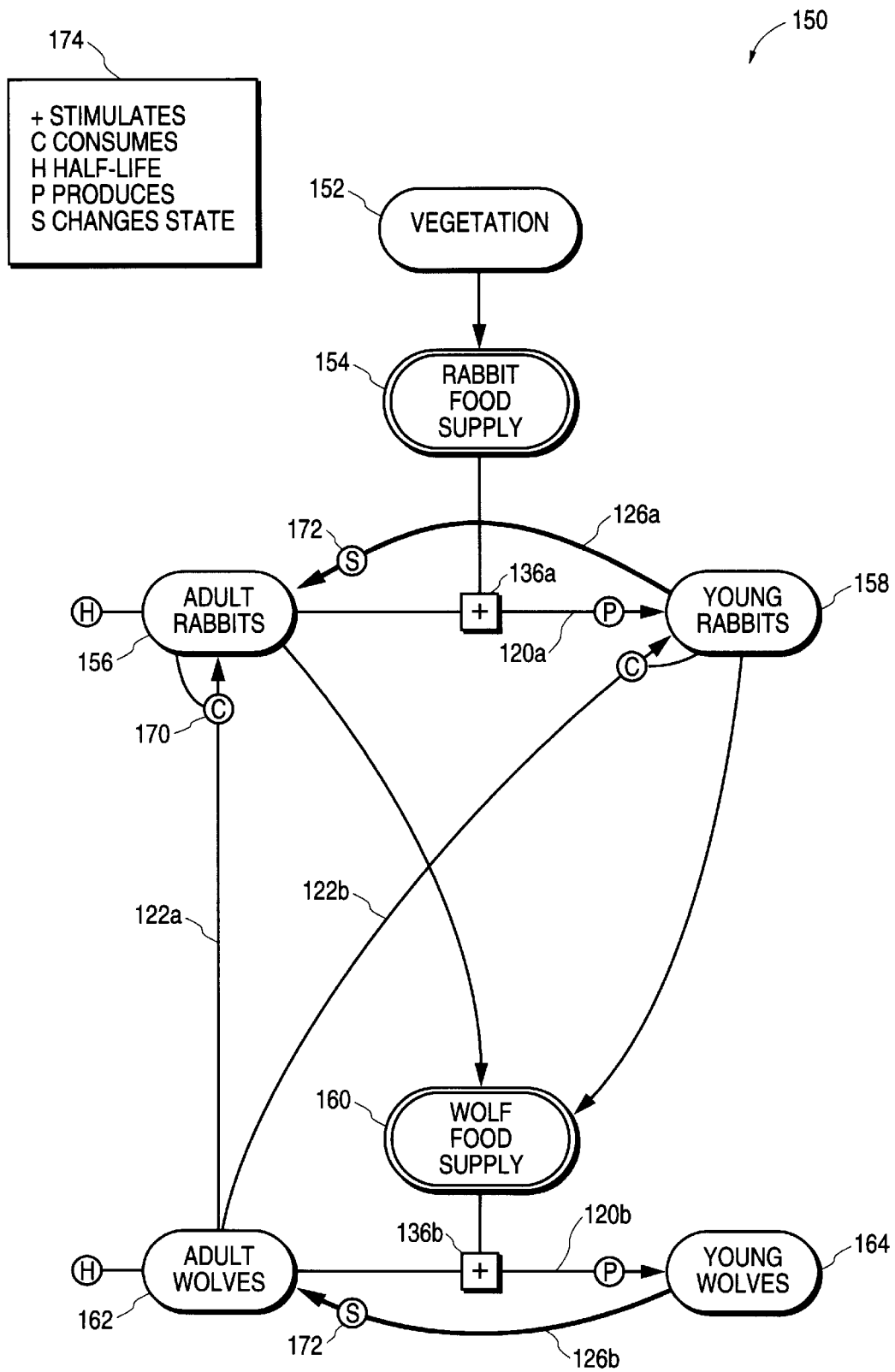
FIG. 9 illustrates an exemplary representation of a simulation model constructed utilizing the graphical elements defined according to one embodiment of the present invention.

The graphical elements discussed below with reference to FIGS. 6–8 may be used to construct a simulation model, such as that shown in FIG. 9. Referring firstly to FIG. 6, there are illustrated examples of two node types, namely a state node 110 and a function node 112. In order to distinguish between state and function nodes 110 and 112, reference will also be made now to FIG. 9. FIG. 9 illustrates an exemplary simulation model 150 that represents a predator-prey system. In the model system, the predators comprise wolves and the prey comprises rabbits.

Referring back to FIG. 6, a state node 110 represents an underlying state object defining a condition or state within the modeled system. In the representation of the simulation model 150 in FIG. 9, it will be noted that state node represent various conditions within the model. Specifically, a "vegetation" state node 152 represents the state of vegetation within the model 150, while state nodes 156, 158, 162 and 164 respectively represent rabbit and wolf population numbers. The various objects underlying the state nodes may comprise one or more parameters and/or one or more equations (or methods) which are effected or influenced by links (which may also be termed "arrows") which feed into the respective state node,. For example, the "adult rabbits" state node 156 represents an object including a parameter indicating the number of adult rabbits within the simulation at any specific time.

In summary, a parameter of a state object may be defined as the integrated sum of all effects acting on the relevant object (which is represented by a node representation), each effect being defined by a link object and represented by the link representation feeding into the node. The quantitative magnitudes of these effects is a function of the parameters of the link objects represented by the link representations, and of the parameters of state objects shown to be "connected" to the opposite ends of such link representations.

Referring to FIG. 6, a function node 112 represents a function object that defines an element within the simulation model that is purely a function of an object within the simulation model. Referring again to the simulation model 150 shown in FIG. 9, two function nodes 154 and 160 are shown respectively to represent objects representing rabbit food supply and wolf food supply. Each of the function nodes 156 and 160 includes a parameter that is a function of parameters of nodes that are shown by links to feed into the relevant function node. For example, the function node 154, which has a parameter whose value represents the quantity of rabbit food available, is shown to be a function of the vegetation node 152. Similarly, the function node 160, which includes a parameter whose value indicates the available quantity of wolf food, is a function of the "adult rabbit" node 156, and the "young rabbit" node 158.

FIG. 7 illustrates, a set of link representations 118–128 which a model builder may select to represent a relationship condition which exists between two objects, represented by nodes, within simulation model. Each of the link representations 118–128 is associated with and represents a different relationship condition. Referring firstly to a "constant effect" link representation 118, this link representation indicates a relationship condition between first and second objects, represented by the state nodes 115 and 117 respectively, wherein the first object has an effect on the second object, and this effect is independent of any values of parameters, associated with the first or second node. In one embodiment the link representation 118 represents the effect as constant over the duration of a simulation operation. The link representation 118 is distinguished in that the tail portion of the link representation is spaced from the circle behind the arrowhead. A "proportional effect" link representation 120 represents a relationship condition between first and second objects wherein the first object has an effect on the second object, and the magnitude of this effect is dependent on the value of a parameter of the first object, represented by state node 115. The link representation 120 is distinguished in that the tail portion thereof contacts the circle behind the arrowhead. Referring to FIG. 9, examples of "proportional effect" link representations are indicated at 120a and 120b. Specifically, the "adult rabbit" state node 156 is shown to have a proportional effect on the "young rabbit" state node 158 in that the number of young rabbits will increase in proportion to the number of adult rabbits. The same holds true for the link representation 120b, which represents the effect of the "adult wolves" node 162 on the "young wolves" node 164.

An "interaction effect" link representation 122 represents that a first object, represented by the state node 115, has an effect on a second object, represented by state node 117 and that the effect is dependent on the values of parameters of both the first and second objects. The link representation 122 is distinguished in that the tail portion of the representation engages the circle, and in that an arcuate line extends from the circle to the state node 117. Referring again to FIG. 9, two examples of "interaction effect" link representations are shown at 122a and 122b. Specifically, the "adult wolves" node 162 is shown to have an effect on the "adult rabbits" node 156. Specifically, as indicated by the "C" in the circle 170, adult wolves consume adult rabbits. The rate or magnitude of this consumption is determined by both the number of adult wolves and the number of adult rabbits, and the effect of the object represented by node 162 on the object represented by node 156 is accordingly dependent on the value of parameters (e.g. population numbers) associated with each of these objects respectively. The same explanation applies regarding the effect of the object represented by the "adult wolves" node 162 on the object represented by the "young rabbits" node 158, between which the "interaction effect" link representation 122b extends.

A "constant conversion" link representation 124, shown in FIG. 7, represents that instances of a first object represented by the state node 115 are converted to instances of a second object represented by the state node 117. The "constant conversion" link representation 124 further represents that the number of instances converted is independent of any values of parameters associated with the first or second object. In one embodiment, the link representation 124 denotes this conversion as being constant, and is not effected by external parameters. The link representation 124 is characterized in that a tail portion thereof is thickened relative to the tail portion of the "constant effect" link representation 118, and that this tail portion is spaced from the circle behind the head of the ink representation 124.

A "proportional conversion" link representation 126 represents that a number of instances of a first object, represented by the state node 115, are converted to instances of a second object, represented by the state node 117. Further, the link representation 126 indicates that the number of instances converted is dependent on the number of instances of the first object. Referring to FIG. 9, "proportional conversion" link representations are drawn at 126a and 126b. Specifically, the link representation 126a represents that instances of an object represented by the "young rabbit" node 158 are converted to instances of an object represented by the "adult rabbit" node 156. Further, the number of young rabbits (i.e. young rabbit instances) converted to adult rabbits (i.e. adult rabbit instances) is dependent on the number of young rabbit instances, which exist within the object represented by node 158. Similarly, the number of instances of an object represented by the "young wolves" node 164 that are converted to instances of an object represented by the "adult wolves" node 162 is dependent on the number of instances of the object represented by the "young wolves" node 164. The circles 172 of the "proportional conversion" link representations 126a and 126b are shown to include the letter "S", which indicates that the type of conversion that occurs is a change in state. It will be appreciated that any symbol could similarly be included within the circle of a link representation to provide further information regarding the type of relationship condition which exists between objects represented by nodes between which a link representation extends.

An "interaction conversion" link representation 128 represents that a number of instances of a first object, represented by state node 115, are converted to instances of a second object, represented by state node 117. Further, the "interaction conversion" link representation 128 represents that the number of instances of the first object that are converted to instances of the second object is dependent upon respective numbers of instances of both the first and the second objects. The link representation 128 is distinguished in that the tail portion is thickened relative to the tail portion of the link representation 122, and that an arcuate line extends from a circle within the representation 128 to the state node 117 representing the second object.

From the above description of the link representations 118–128, it will be noted that each link represents a relationship condition between first and second objects as being either an "effect" relationship or a "conversion" relationship. Further, each link representation 118–128 represents the relationship condition as being either constant, proportional or interactive.

The link representations 118–128 shown in FIG. 7 are exemplary, and any appropriate link representations can be used to represent the various relationship conditions described above. It will be appreciated that the relationship conditions that are represented by the various link representations 118–128 are typically defined by the model builder. To this end, examples of mathematical expressions of relationship conditions that may be represented by the various link representations are provided below in Table 1. The mathematical expressions given in Table 1 are for a dynamic simulation model which is driven by the progression of time. The link representations 118–128 could similarly be used in a static model.

TABLE 1

| LINK TYPE | RELATIONSHIP CONDITION (EQUATION) |
|---|---|
| Constant Effect Link | $\frac{dT}{dt} = K + \ldots$ <br><br> where T is the target node and K is a constant. |
| Proportional Effect Link | $\frac{dT}{dt} = C \cdot S(t)^a + \ldots$ <br><br> where T is the target node, S is the source node, C is a coefficient, and a is an exponent. |
| Interaction Effect Link | $\frac{dT}{dt} = C(S(t)^a + T(t)^b) + \ldots$ <br><br> where T is the target node, S is the source node, and a and b are exponents. This equation can vary depending on the operation selected in the parameter dialog. The operations available are S + T, S − T, S*T, T/S, and S/T. The equation shown is for S + T. |
| Constant Conversion Link | $\frac{dT}{dt} = K \cdot R + \ldots$ <br><br> $\frac{dS}{dt} = -K + \ldots$ <br><br> where T is the target node, S is the source node, K is a constant, and R is a conversion ratio. |
| Proportional Conversion Link | $\frac{dT}{dt} = C \cdot R \cdot S(t)^a + \ldots$ <br><br> $\frac{dS}{dt} = -C \cdot S(t)^a + \ldots$ <br><br> where T is the target node, S is the source node, C is a coefficient, R is a conversion ratio, and a is an exponent. |
| Interaction Conversion Link | $\frac{dT}{dt} = R \cdot C(S(t)^a + T(t)^b) + \ldots$ <br><br> $\frac{dS}{dt} = -C(S(t)^a + T(t)^b) + \ldots$ <br><br> where T is the target node, S is the source node, a and b are exponents, and R is a conversion ratio. This equation can vary depending on the operation selected in the parameter dialog. The operations available are S + T, S − T, S*T, T/S, and S/T. The equation shown is for S + T. |

As noted above, each of the link representations 118–128 includes a circle in which a graphical identifier providing further information regarding the relationship condition can be displayed. For example, referring to FIG. 9, each of the link representations is shown to contain an alphabet letter which provides further information regarding the relationship condition between two respective objects. A GUI may also provide an index table 174, such as shown in FIG. 9, which provides a key to the identifiers displayed in the circles of the various link representations.

Figure 10:
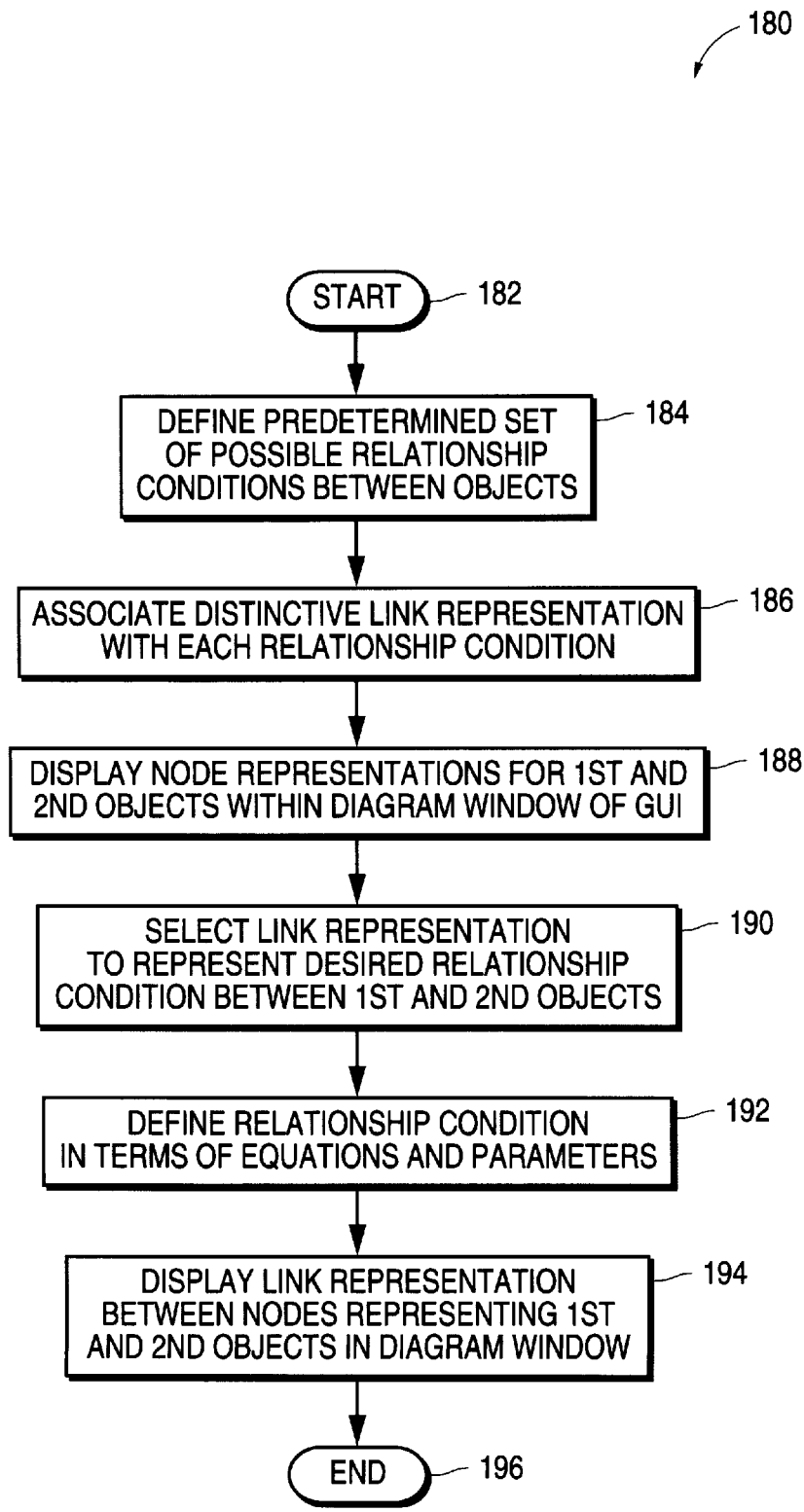
FIG. 10 is a flow chart illustrating a method, according to one embodiment of the present invention, of generating a display of a simulation model.

Referring now to FIG. 10, there is shown a flow chart illustrating a method 180, according to one exemplary embodiment of the invention, of generating a display (or graphical representation) of a simulation model. In one embodiment, the steps of method 180 are performed by a GUI in conjunction with the software core 52 illustrated in FIG. 3. The method commences at step 182, and proceeds to step 184 where a predetermined set of relationship conditions that may exist between objects in the simulation model are defined. For example, the defined relationship conditions may comprise the six relationship conditions described above with reference to FIG. 7, and may be expressed in the form of equations. At step 186, a respective link representation is associated with each of the relationship conditions in the set. For example, the link representations 118–128 may each be associated with a distinct relationship condition, as described above with reference to FIG. 7. Looking now at a minimum construction at step 188, the GUI displays node representations, such as state nodes 115 and 117, for first and second objects. The display of the node representations occurs in response to a user input. At this step a user may also input further information, such as parameter values, equations and documentation, to define the diagram objects (i.e. state and/or function objects) such as those shown at 54 in FIG. 3.

Having thus generated at least two node representations for display by the GUI, and having defined the objects that underlie these node representations, the user at step 190 then selects a link representation, from the link representations associated with the predetermined set of relationship conditions, to represent a desired relationship condition between the objects represented by the first and second nodes. At step 192, a user may then further define the relationship condition between the objects in terms of equations and parameters. For example, the relationship condition between the objects could be expressed in terms of a dynamic equation such as any one of those provided above in Table 1. Parameters defining the relationship condition may be inputted and defined by using a parameter window 90 such as that shown in FIG. 5. The user may also optionally specify further information to be included within the link representation. For example, the user may specify an identifier to be incorporated within the circle of any one of the link representations 118–128 shown in FIG. 7. The method 180 then proceeds to step 194, where the GUI displays the selected link representation to show the relationship condition that exists between the objects represented by the first and second nodes.

The association of different link representations with each distinct relationship condition of a set is particularly advantageous in that a user viewing a display of a simulation model, such as the simulation model 150 in FIG. 9, is able immediately to ascertain and understand the relationships between the objects represented by the nodes without having to "drill-down" into the representation or to access additional information windows. The inclusion of identifiers within the respective circles of each of the link representations 118–128, and the provision of a key 174 for each of the identifiers, further enhances understanding of the display.

Figure 11:
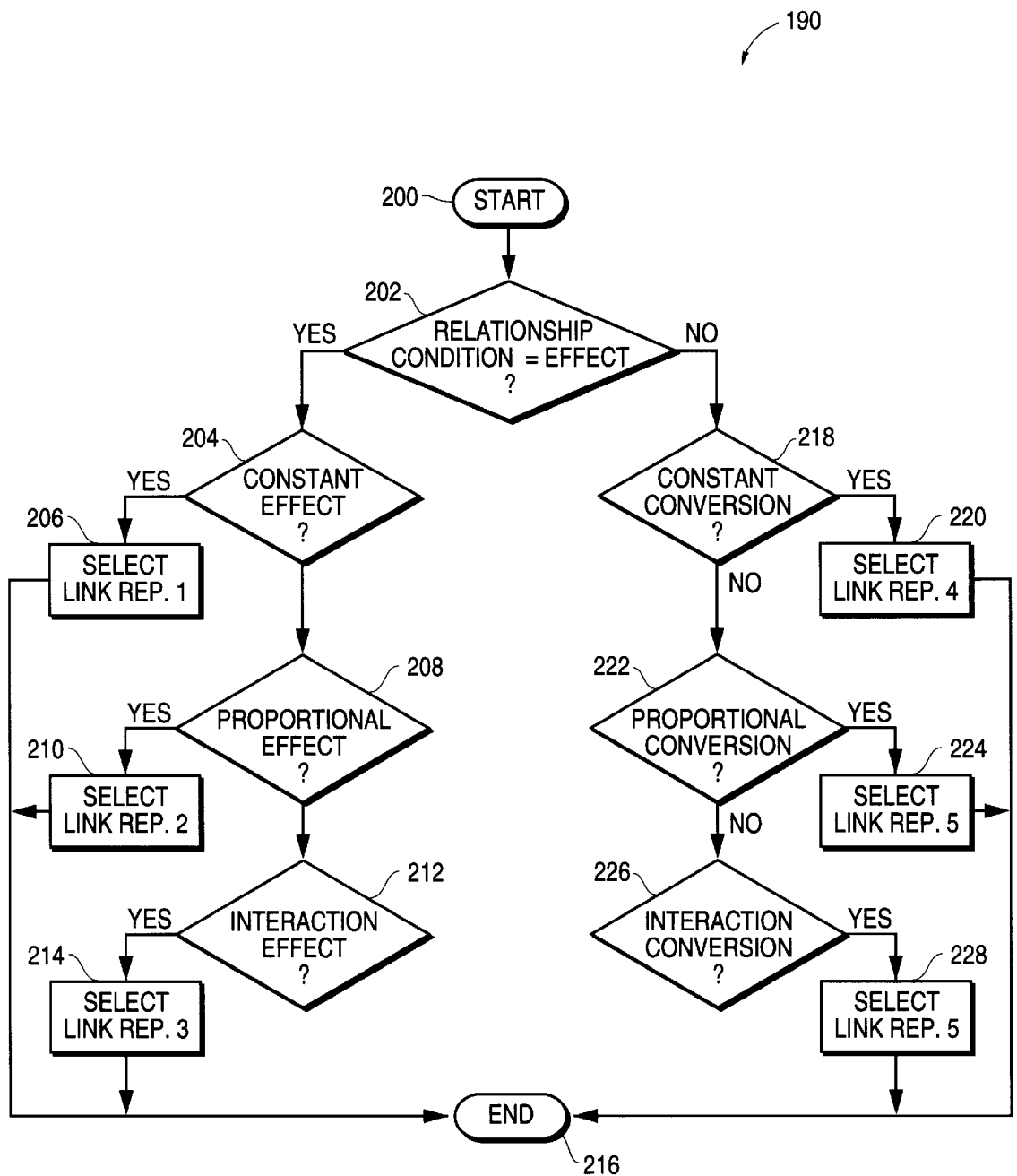
FIG. 11 is a flow chart illustrating a method, according to one embodiment of the present invention, of selecting a link representation to represent the relationship condition between two objects within a simulation model.

FIG. 11 is a flow chart illustrating an exemplary method 190 of selecting a link representation from a predefined set to represent a relationship condition between objects represented by first and second nodes within a diagram window. The method 190 commences at the step 200 and then proceeds to decision box 202, where a determination is made as to whether the relationship condition between the first and second objects is an "effect" relationship or a "conversion" relationship. If it is determined that the relationship condition is properly classified as an effect relationship, the method proceeds to decision box 204, where a determination is made as to whether the effect is constant. If so, an appropriate link representation (e.g. link representation 118) is selected at step 206. If the effect relationship is not constant, the method 190 proceeds to decision box 208, where a determination is made as to whether the effect of the one object on the other is dependent on the value of a parameter associated with one of the objects. If so, the method proceeds to step 210, where an appropriate link representation (e.g. link representation 120) is selected. Alternatively the method 190 proceeds to decision box 212, where a determination is made as to whether the effect of one object on the other is dependent on values of parameters associated with each of the objects. If so, the method 190 proceeds to step 214, where an appropriate link representation (e.g. link representation 122) is selected. From step 214, the method terminates at step 216.

Returning to decision box 202, if it is determined that the relationship condition between the objects is not an "effect" relationship condition, but rather a "conversion" relationship condition, the method proceeds from decision box 202 to decision box 218, where a determination is made as to whether the "conversion" relationship condition requires that a constant number of instances of one object be converted to instances of the other object. If so, the method proceeds to step 220, where an appropriate link representation (e.g. link representation 214) is selected. Alternatively, the method proceeds to decision box 222, where a determination is made as to whether the "conversion" relationship condition specifies that the number of instances of the one object that are converted to instances of the other object is dependent on the number of instances of either one of these objects. If so, the method proceeds to step 224, where an appropriate link representation (e.g. link representation 126) is selected. Alternately, the method proceeds to decision box 226, where a determination is made as to whether the "conversion" relationship condition requires that the number of instances of one object that are converted to instances of the other object is dependent on respective numbers of instances in both the first and second objects. If so, an appropriate link representation (e.g. link representation 128) is selected. From step 228, the method 190 proceeds to terminate at step 216.

Returning to FIG. 8, a model builder may wish to model a situation where a relationship condition, represented by a link representation 138, between objects represented by nodes 130 and 132, is influenced by a third object, represented by node 134. According to one embodiment of the present invention, overlaying the relevant link representation 138 with a modifier representation 136 may represent this influence of the third object on the relationship condition between the first and second objects. The node 134 representing the third object is further shown to feed into the modifier representation 136 by a link representation 137. The modifier representation 136 includes an identifier that provides an indication of the type of effect the third object has on the relevant relationship condition. For example, as it is case in FIG. 8, the modifier representation 136 may include a "+" symbol, which may indicate that the third node has a stimulating effect on the relevant relationship condition. Referring to FIG. 9, modifier representations 136a and 136b each include the "+" symbol, which indicates that a third object (i.e. a "rabbit food supply" object) has a stimulating effect on the production by "adult rabbits" object instances of "young rabbits" object instances. The modifier representation 136 represents an analogous situation with respect to the wolf population in the simulation model 150.

In one embodiment of the present invention, a modifier representation may include a "−" symbol to represent that a third object has an inhibiting effect on the relationship condition between a pair of objects. Further, a modifier representation may include a "=" symbol which indicates that the third object may have either an inhibiting or stimulating effect on the relationship between a pair of objects, dependent on the value of a parameter of the third object. For example, a parameter of the third object could have a certain threshold below which the third object has a stimulating effect on the relationship condition and above which the third object has an inhibiting effect on the relationship condition.

Figure 12:
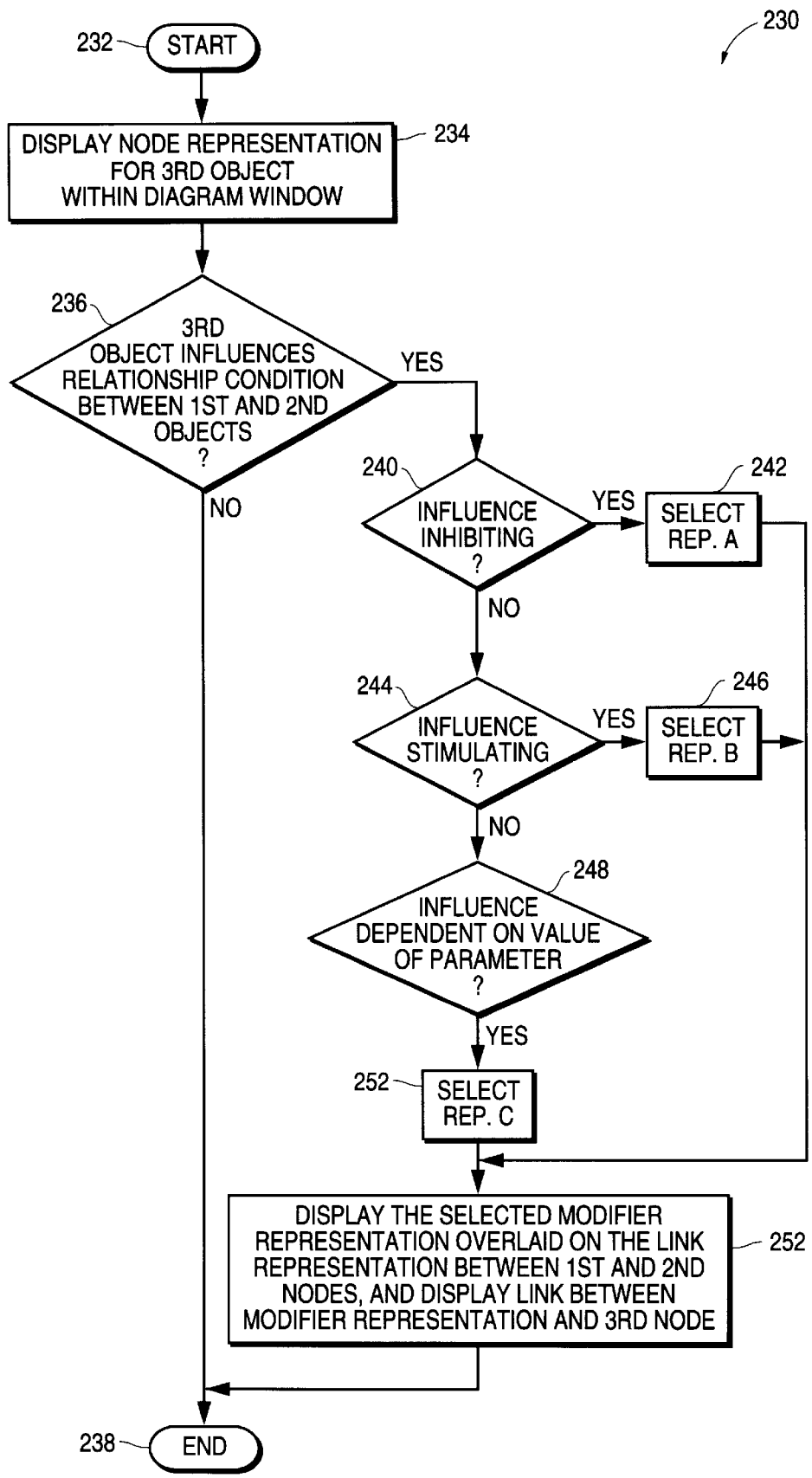
FIG. 12 is a flow chart illustrating a method, according to one embodiment of the present invention, of displaying a modifier representation which represents the influence of an object on a relationship condition between a pair of objects.

To this end, reference is now made to FIG. 12 which illustrates a method 230, according to one embodiment of the invention, of displaying a modifier representation which represents the influence of an object on a relationship condition commences pair of objects. The method commences at step 232, and proceeds to step 234 where a node representation for a third object of the simulation model is displayed within a diagram window in response to a user input. The method then proceeds to decision box 236, where determination is made as to whether the third object influences, a relationship condition, represented by an appropriate link representation, between two objects represented in the diagram window by respective node representations. If not, the method terminates at step 238. If so, the method proceeds to decision box 240, where a determination is made as to whether this influence is inhibiting. If so, a modifier representation including an appropriate identifier (e.g. "−") is selected at step 242. Alternatively, the method 230 proceeds to decision box 244, where a determination is made as to whether the influence is stimulating. If so, a modifier representation, including an appropriate identifier (e.g. "+") is selected at step 246. Alternatively, the method proceeds to decision box 248, where a determination is made as to whether the influence is dependent on a value of a parameter of the third object. If so, a modifier representation including an appropriate identifier (e.g. "=") is selected at step 252.

The identifiers mentioned above are, of course, merely exemplary and any suitable identifier could be included within a modifier representation to advertise a characteristic of an underlying modifier object. For example, modifier representations including the "A" or "B" could also be used to identify the underlying modifier object as "allowing" or "blocking" a relationship condition (e.g. an effect or conversion relationship condition) between a two objects.

From steps 242, 246 or 252, the method 230 proceeds to step 252, where the selected modifier representation is overlaid on a link representation between nodes for the first and second objects, and a link representation is generated between a node representation for the third object and the modifier representation. The method then terminates at step 238.

The modifier representation represents an underlying modifier object, which may in turn be expressed in terms of an equation. In one embodiment, the modifier object may comprise a function of parameters within the simulation model. An example of an equation expressing a modifier object is provided below in Table 2.

TABLE 2

Modifier $\quad \dfrac{dT}{dt} = M \cdot f\left(\dfrac{S(t)}{N}\right) \cdot \text{linkterm} + \ldots$ where T is the target node, M is a multiplier constant, N is a normalization constant, f() is a function, either linear or specified by a transformation curve, and link term is the a link term. Note that modifiers also have an additive or multiplicative setting; this setting specifies whether multiple modifiers on a link should add or multiply their terms together before being multiplied by the link term.

In Table 2, the "linkterm" expression refers to an equation which is embodied in a link object to express a relationship condition between two objects. Examples of such equations are provided above in Table 1 in the "RELATIONSHIP CONDITION (EQUATION)" column.

Computer System

Figure 13:
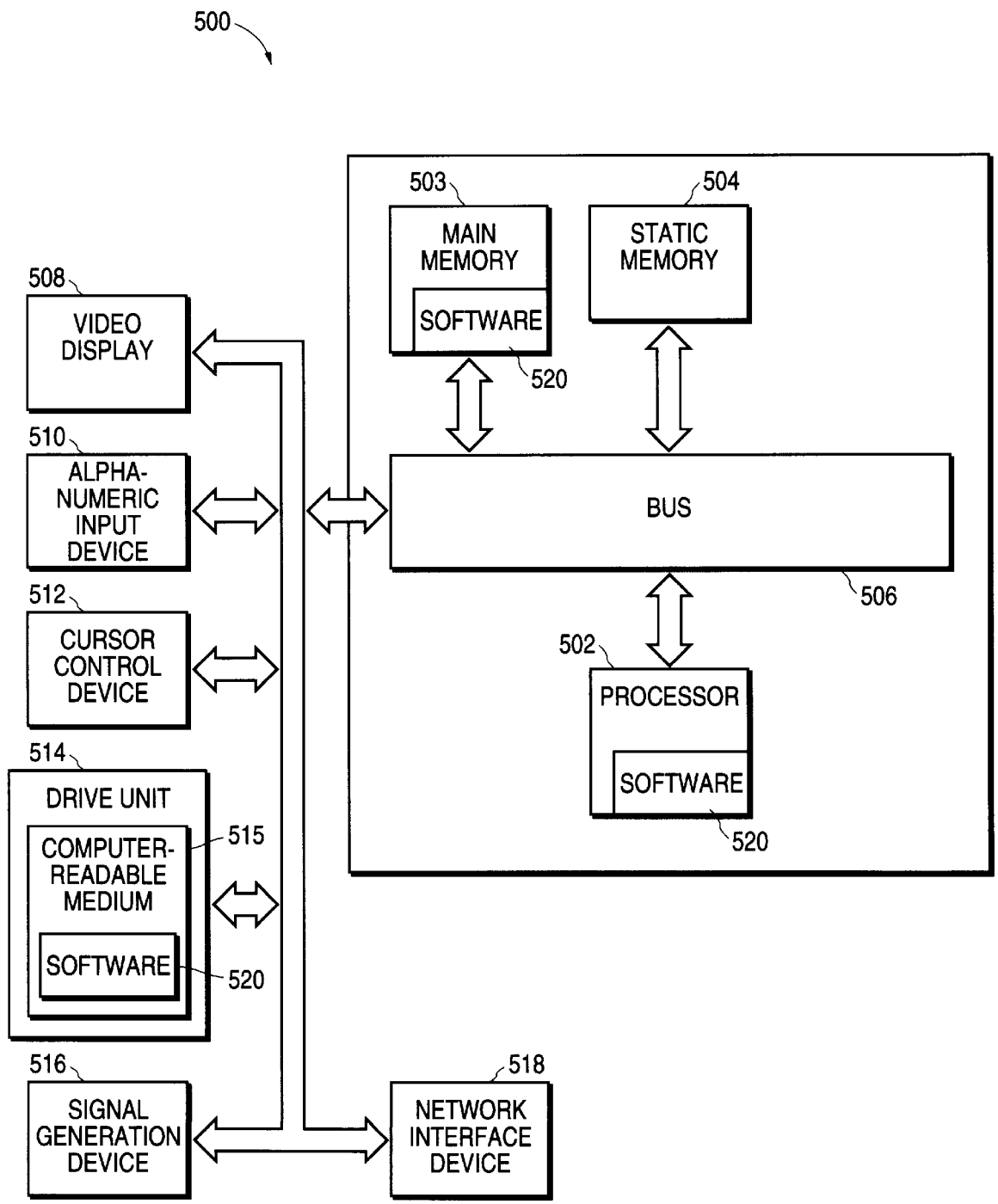
FIG. 13 is a diagrammatic representation of a computer system within which software, for performing the methodologies discussed above, may reside and be executed.

FIG. 13 shows a diagrammatic representation of a computer system 500 within which software for performing the methodologies discussed above, and for generating a GUI according to the teachings of the present invention, may operate. The computer system 500 includes a processor 502, a main memory 503 and a static memory 504, which communicate via a bus 506. This system 500 is further shown to include a video display unit 508 (e.g., a liquid crystal display (LCD) or a cathode ray tube (CRT)) on which a GUI according to the present invention may be displayed. The computer system 500 also includes an alpha-numeric input device 510 (e.g. a keyboard), a cursor control device 512 (e.g. a mouse), a disk drive unit 514, a signal generation device 516 (e.g. a speaker) and a network interface device 518. The disk drive unit 514 includes a computer-readable medium 515 on which software 520 for executing each methodology described above and for generating the various graphic elements comprising the invention is stored. The software 520 is also shown to reside, completely or at least partially, within the main memory 503 and/or within the processor 502. The software 520 may further be transmitted or received via the network interface device 518. For the purposes of this specification, the term "computer-readable medium" shall be taken to include any medium which is capable of storing or encoding a sequence of instructions for performing the methodologies of the present invention, and shall be taken to included, but not be limited to, optical and magnetic disks, and carrier wave signals.

Thus, a method of generating a display of a simulation model including first and second objects has been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of generating a display, on a display device, of a simulation model including first and second objects between which a relationship condition exists, the method including:

displaying, on the display device, respective first and second node representations for the first and second objects;

determining user selection of a link representation from a set of link representations to represent the relationship condition between the first and second objects, each link representation in the set being associated with a different relationship condition; and displaying, on the display device, the selected link representation to represent the relationship condition between the first and second objects;

wherein a first link representation of the set of link representations is user selectable to represent that the first object has an effect on the second object and a second link representation of the set of link representations is user selectable to represent that instances of the first object are converted to instances of the second object.

2. The method of claim 1 wherein the determining of the user selection of the link representation comprises determining user selection of the first link representation to represent that the first object has an effect on the second object.

3. The method of claim 2 wherein the determining of the user selection of the link representation comprises determining user selection of the first link representation to represent the effect as being dependent on a parameter value.

4. The method of claim 3 wherein the parameter value is a value associated with a link object describing the relationship condition between the first and second objects and represented by the first link representation.

5. The method of claim 3 wherein the parameter value is a value associated with either the first or the second object.

6. The method of claim 2 wherein the determining of the user selection of the link representation comprises determining user selection of the first link representation to represent the effect of the first object on the second object as being independent of any values of parameters associated with the first or second object.

7. The method of claim 2 wherein the determining of the user selection of the link representation comprises determining user selection of the first link representation to represent the effect of the first object on the second object as being dependent to a value of a parameter of the first object.

8. The method of claim 2 wherein the determining of the user selection of the link representation comprises determining user selection of the first link representation to represent the effect of the first object on the second object as being dependent on respective values of parameters of both the first and second objects.

9. The method of claim 2 including providing an identification of the type of effect the first object has on the second object.

10. The method of claim 1 wherein the determining of the user selection of the link representation comprises determining user selection of the second link representation that represents that instances of the first object represented by the first node are converted to instances of the second object represented by the second node.

11. The method of claim 10 wherein the determining of the user selection of the link representation comprises determining user selection of the second link representation to represent the conversion as being dependent on a parameter value.

12. The method of claim 11 wherein the parameter value is a value associated with a link object describing the relationship condition between the first and second objects and represented by the second link representation.

13. The method of claim 11 wherein the parameter value is a value associated with either the first or the second object.

14. The method of claim 10 wherein the determining of the user selection of the link representation comprises determining user selection of the second link representation to represent the conversion as being independent of any values of parameters associated with the first or second object.

15. The method of claim 10 wherein the determining of the user selection of the link representation comprises determining user selection of the second link representation to represent the conversion as being dependent on a value of a parameter of the first object.

16. The method of claim 10 wherein the determining of the user selection of the link representation comprises determining user selection of the second link representation to represent the conversion as being dependent on values of parameters of both the first and second objects.

17. The method of claim 10 including providing an identification of the type of conversion by which instances of the first object are converted to instances of the second object.

18. The method of claim 1 including determining user selection of a modifier representation to represent an influence of a third object on the relationship condition between the first and second objects, and displaying, on the display device, the modifier representation to represent the influence of the third object on the relationship condition between the first and second objects.

19. The method of claim 18 including determining user selection of a modifier representation to represent the third object as having an effect on the relationship condition between the first and second objects dependent on a value of at least one parameter.

20. The method of claim 19 wherein the at least one parameter is a parameter included within a modifier object represented by the modifier representation.

21. The method of claim 19 wherein the at least one parameter is a parameter included within the third object.

22. The method of claim 18 including providing, in association with the modifier representation, an identification of the type of effect the third object has on the relationship condition between the first and second objects.

23. A method of presenting a set of link representations to represent a relationship condition between first and second objects in a display of a simulation model, the method comprising:

recording a definition of a set of relationship conditions between objects within the simulation model;

recording an assignment of a respective link representation to each relationship condition of the set of relationship conditions, so as to define a set of link representations; and presenting the set of link representations on a display device for selection by a user to represent the relationship condition between the first and second objects of the simulation model, wherein a first link representation of the set of link representations is user selectable to represent that the first object has an effect on the second object and a second link representation of the set of link representations is user selectable to represent that instances of the first object are converted to instances of the second object.

24. The method of claim 23 wherein the recording of the definition comprises recording a definition of the first object as having an effect on the second object.

25. The method of claim 24 wherein the recording of the definition comprises recording a definition of the effect as being dependent on a parameter value.

26. The method of claim 23 wherein the recording of the definition comprises recording a definition of instances of the first object as being converted to instances of the second object.

27. The method of claim 26 wherein the recording of the definition comprises recording a definition of the conversion as being dependent on a parameter value.

28. The method of claim 23 including recording a definition of a modifier representation to represent an influence of a third object on the relationship condition between the first and second objects, and presenting the modifier representation on the display device for selection by a user to represent the influence of the third object on the relationship condition between the first and second objects.

29. A computer-readable medium storing a sequence of instructions which, when executed by a processor, cause the processor to perform the steps of:

displaying respective first and second node representations of the first and second objects on a display device;

presenting a set of link representations for selection by a user to represent the relationship condition between the first and second objects, each link representation in the set being associated with a different relationship condition; and displaying a user-selected link representation to represent the relationship condition between the first and second objects, wherein a first link representation of the set of link representations is user selectable to represent that the first object has an effect on the second object and a second link representation of the set of link representations is user selectable to represent that instances of the first object are converted to instances of the second object.

30. A computer-readable medium storing a sequence of instructions that, when executed by a processor, cause the processor to perform the steps of:

identifying a set of potential relationship conditions between objects within the simulation model;

recording an assignment of a respective link representation to each relationship condition of the set of potential relationship conditions, so as to define a set of link representations; and presenting the set of link representations on a display device for selection by a user to represent the relationship condition between first and second objects of the simulation model, wherein a first link representation of the set of link representations is user selectable to represent that the first object has an effect on the second object and a second link representation of the set of link representations is user selectable to represent that instances of the first object are converted to instances of the second object.

31. Logic to generate a display, on a display device, of a simulation model including first and second objects between which a relationship condition exists, the logic including:

core logic to determine user selection of a link representation from a set of link representations to represent the relationship condition between the first and second objects, each link representation in the set being associated with a different relationship condition; and display logic to display, on the display device, respective first and second node representations for the first and second objects and to display the selected link representation to represent the relationship condition between the first and second objects, wherein a first link representation of the set of link representations is user selectable to represent that the first object has an effect on the second object and a second link representation of the set of link representations is user selectable to represent that instances of the first object are converted to instances of the second object.

32. The logic of claim 31 wherein the core logic determines user selection of the first link representation to represent that the first object has an effect on the second object.

33. The logic of claim 31 wherein the core logic determines user selection of the second link representation to represent that instances of the first object represented by the first node are converted to instances of the second object represented by the second node.

34. The logic of claim 31 wherein the core logic determines user selection of a link representation that represents the relationship condition between the first and second objects as being selected from a group comprising a constant relationship condition, a proportional relationship condition or an interaction relationship condition.

35. Logic to present, on a display device, a set of link representations to represent a relationship condition between first and second objects in a display of a simulation model, the logic comprising:

core logic to record a definition of a set of relationship conditions between objects within the simulation model and to record the assignment of a respective link representation to each relationship condition of the set of relationship conditions, so as to define a set of link representations; and display logic to present, on the display device, the set of link representations on a display device for selection by a user to represent the relationship condition between the first and second objects of the simulation model, wherein a first link representation of the set of link representations is user selectable to represent that the first object has an effect on the second object and a second link representation of the set of link representations is user selectable to represent that instances of the first object are converted to instances of the second object.

36. Logic to generate a display, on a display device, of a simulation model including first and second objects between which a relationship condition exists, the logic including:

first means for detecting user selection of a link representation from a set of link representations to represent the relationship condition between the first and second objects, each link representation in the set being associated with a different relationship condition; and second means for displaying, on the display device, respective first and second node representations for the first and second objects and for display the selected link representation to represent the relationship condition between the first and second objects, wherein a first link representation of the set of link representations is user selectable to represent that the first object has an effect on the second object and a second link representation of the set of link representations is user selectable to represent that instances of the first object are converted to instances of the second object.

37. Logic to present, on a display device, a set of link representations to represent a relationship condition between first and second objects in a display of a simulation model, the logic comprising:

first means for recording a definition of a set of relationship conditions between objects within the simulation model and for recording an assignment of a respective link representation to each relationship condition of the set of relationship conditions, so as to define a set of link representations; and second means for presenting, on the display device, the set of link representations on a display device for selection by a user to represent the relationship condition between the first and second objects of the simulation model, wherein a first link representation of the set of link representations is user selectable to represent that the first object has an effect on the second object and a second link representation of the set of link representations is user selectable to represent that instances of the first object are converted to instances of the second object.

* * * * *